UNITED STATES PATENT OFFICE.

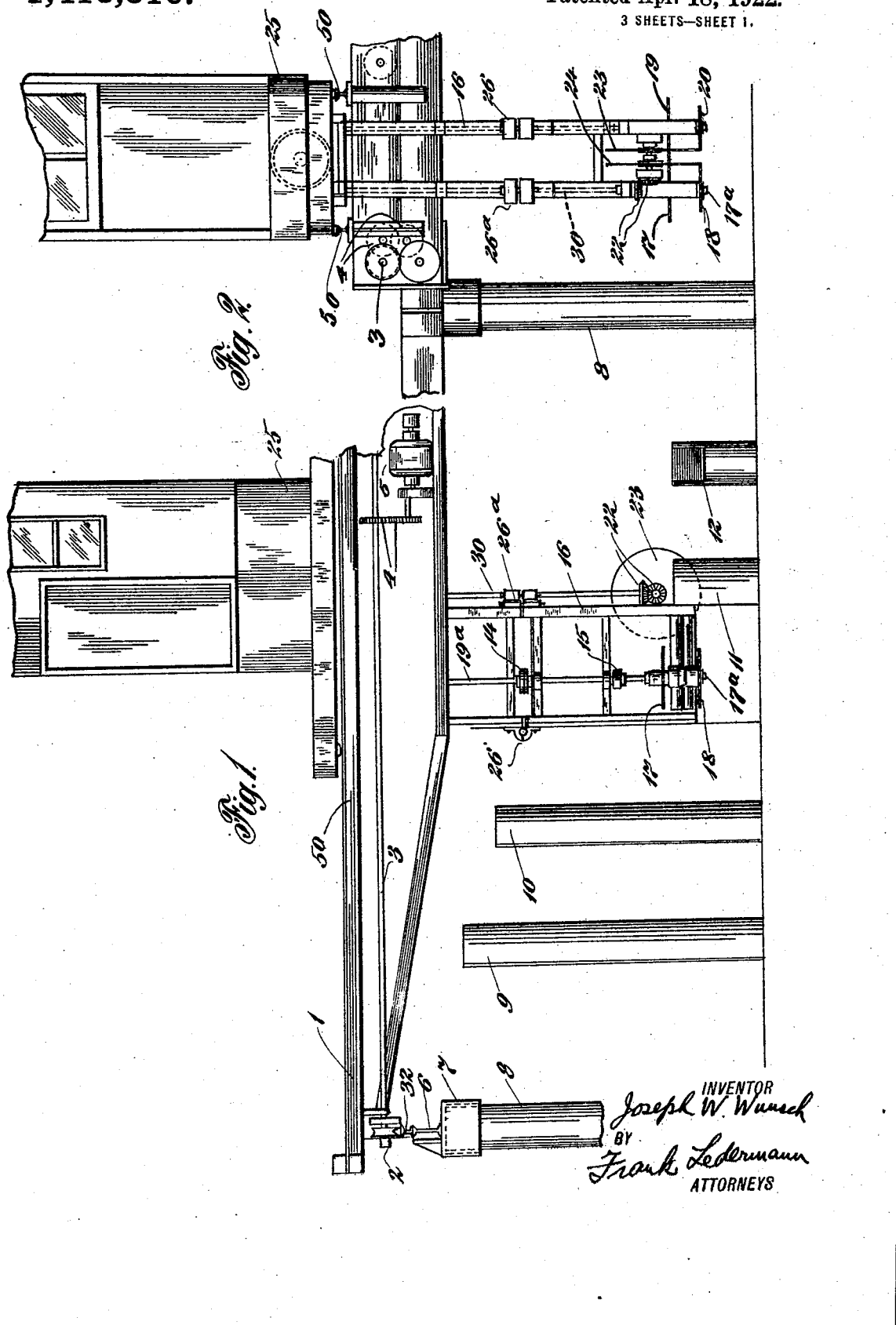

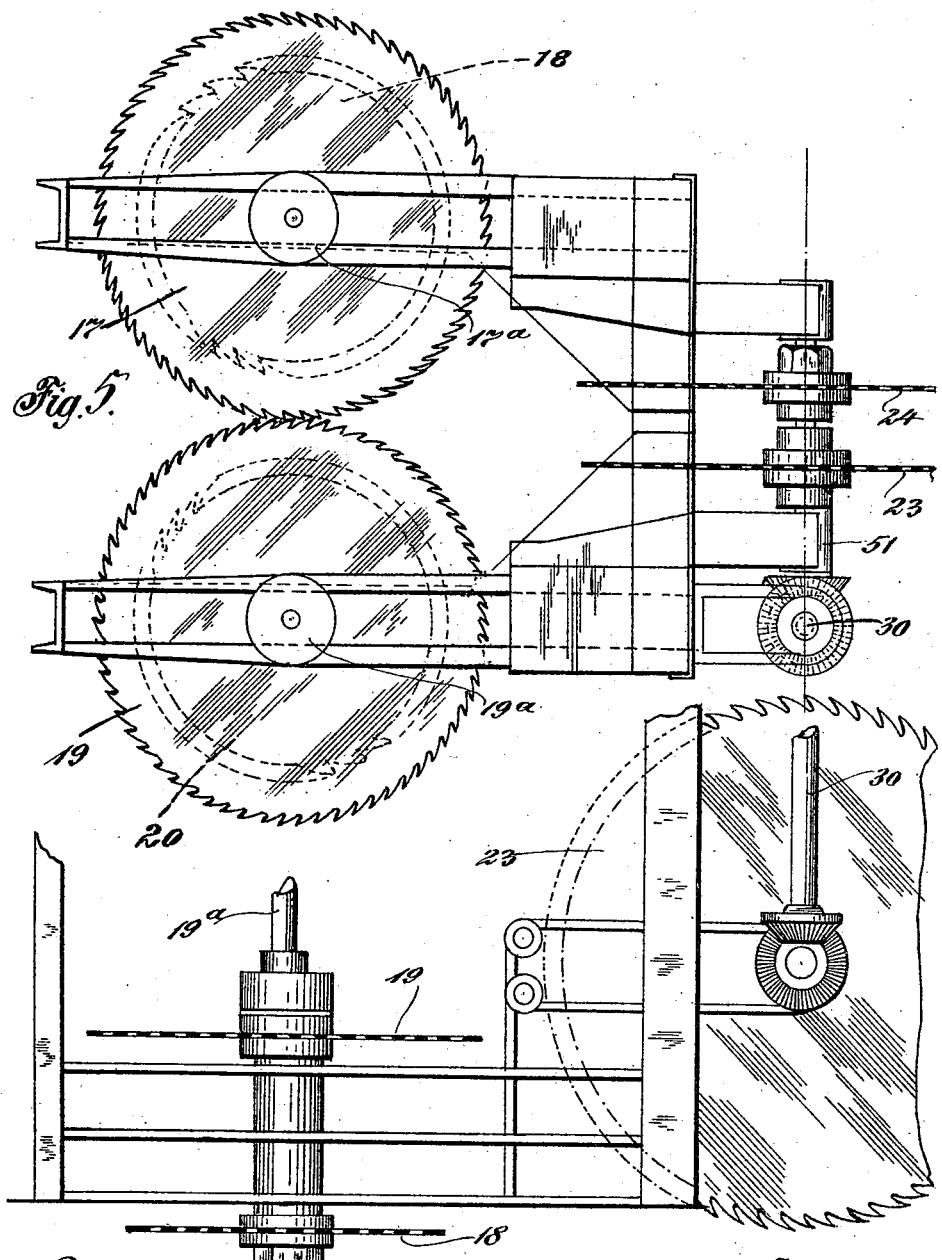

JOSEPH W. WUNSCH, OF BROOKLYN, NEW YORK.

PILE-CUTTING MACHINE.

1,413,310.

Specification of Letters Patent.  Patented Apr. 18, 1922.

Application filed February 27, 1920. Serial No. 361,741.

*To all whom it may concern:*

Be it known that I, JOSEPH W. WUNSCH, a citizen of the United States, and resident of Brooklyn, in the county of Kings and State of New York, have invented certain new and useful Improvements in Pile-Cutting Machines, of which the following is a specification.

This invention relates to machines for leveling and tenoning wood piles such as are used in the construction of piers, bridges, and the like.

The main objects of my invention are the provision of a machine for leveling wood piles, or for both leveling and tenoning the same, so as to eliminate the usual hand work employed for these purposes, and to accomplish these results in an efficient and practical manner.

The machine consists essentially of a cab, motor propelled on the tracks of a bridge, which is in turn motor-propelled to travel on tracks which are laid for the latter purpose on the outside rows of piles driven into the ground as the first operation in erecting the pier, or the like. The aforementioned cab contains the mechanism illustrated for operating saws, below described, and a motor for actuating said mechanism. Through the mechanism shown motion is imparted to two spindles operating in a horizontal plane, each spindle carrying two saws. The top saws run almost edge to edge, each saw cutting the pile from the periphery toward the center. The lower saws are of smaller diameter and of dimensions suitable to allow the cutting of the tenon to the desired width. Two vertical saws, mutually displaced at a distance equal to that of the desired tenon, follow the aforementioned saws so as to cut away the material remaining after the aforementioned saws have passed, and thus leave the desired tenon. To allow for adjustment of the center-to-center distance between saws, which may be necessary owing to wear, self-aligning couplings may be employed to transmit the rotation of the saw spindles. The lower part of the saw-carrying structure is preferably hingedly mounted to the upper part in order that the saw mechanism may be raised for the purpose of repairs or adjustment.

The above and other objects will become apparent in the description below, in which characters of reference refer to like-named parts in the drawings.

Referring briefly to the drawings, Fig. 1 represents a partial side view of my device illustrative of its operation.

Fig. 2 is a partial end view of the same.

Fig. 5 is an enlarged plan view of the saws of my device.

Fig. 6 is a side view of the same.

Figure 3:
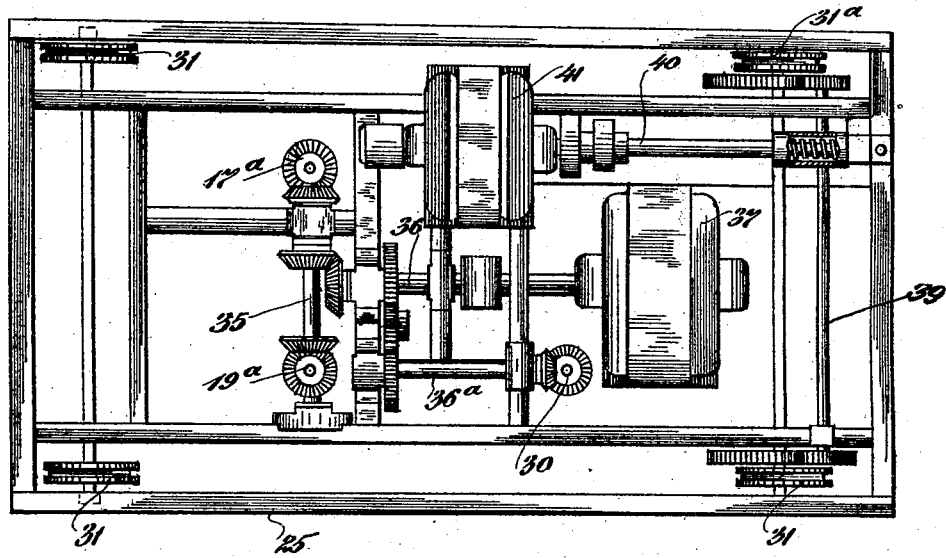
Fig. 3 is a plan view of the driving mechanism of my device.

Referring now in detail to the drawings, the numeral 1 represents the main beam of my machine, which rests upon wheels 2 which run upon tracks 32. These tracks are first mounted upon the outside rows of untrimmed piles 8, or upon two such rows laid especially for this purpose; the tracks do not rest directly upon the tops of these piles, but upon intermediate rails or frames 6 which rest upon caps 7 secured to the tops of said piles 8. The numerals 9, 10, represent piles about to be trimmed, and those 11 and 12 have just been trimmed. A shaft 3 extends between the wheels 2, and is driven by a train of gears 4 actuated by the electric motor 5. Let it here be understood that I do not, however, limit myself to the use of electric motors for my machine, as any other form of prime mover may be used to advantage; nor do I claim any manner of feeding the electric motors shown, for which reason I have not illustrated any method of wiring, as any desirable common method may be employed.

A frame 16 is carried upon the underside of the traveling cab 25 which runs upon the tracks 50 laid upon the beam 1. The lower portion of this frame is hingedly mounted to the upper portion as shown at 26, so that, when necessary, the said lower portion may be swung upward out of the water. For this reason, too, the shafts $17^a$, $19^a$, and 30 below-described are provided with detachable couplings. Vertical shafts $17^a$, $19^a$, and 30 extend downward from the interior of said cab, and are provided with bearings in said frame as shown.

As better seen in the enlarged Figs. 5 and 6, the shaft 30 drives a horizontal, small shaft 51, by means of the bevel gears shown, vertical circular saws 23 and 24 being rigidly mounted on said small shaft and being rotated thereby. Upon each of the shafts or spindles $17^a$ and $19^a$ are mounted two horizontal circular saws, the lower being on the same plane and of lesser diameter than the upper, which are also on the same plane. The upper saws 20 and 19 are so arranged that they rotate in opposite directions and that their teeth almost, but not quite, touch each other; the teeth of each saw are arranged in staggered position relative to the teeth of the other, and they are placed so near together that, when both rotate as indicated by the arrows, they cut off the material acted upon without leaving any ridge of material between them, as they would if the teeth of the saws did not mutually interlap.

Below the saws 17 and 19 are mounted saws 18 and 20, respectively of smaller diameter than the aforementioned saws, the difference between the diameter of the latter and the former being such that the finished tenon will be of the desired width; similarly the distance between the upper and lower saws is such as is desired for the height of the said tenon.

The aforementioned vertical saws 23 and 24 are mounted on such a level that their lowermost tangents will lie in the same plane as the lower horizontal saws. The vertical shafts 17$^a$, 19$^a$, and 30 are provided with detachable couplings so that the lower portions of said shafts may be separated from the upper in order to lift the lower portion of the frame, and the saws, as above mentioned, in order to repair or replace any part.

Figure 4:
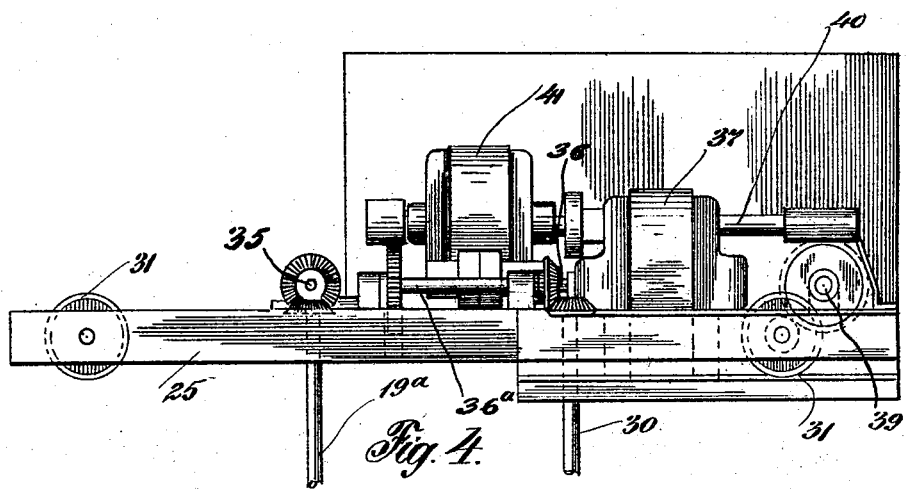
Fig. 4 is a side view of the same.

The driving mechanism of the saws is indicated in Figs. 3 and 4, the same being located in the cab and operated by any suitable method. The motor 41 drives a shaft 40 which is connected by gears and a worm, as shown, to the shaft 39, which drives two of the wheels 31 and thus propels the cab 25 along the beam 1. A second motor 37 drives a shaft 36 which is geared to and drives the shaft 36$^a$, the latter, by the interposition of bevel gears, driving the vertical shaft 30. The shaft 36 is also provided with an extension upon which is mounted a vertical bevel gear which engages a horizontal bevel gear rigid to the shaft 35. This shaft, through the bevel gears shown, drives the vertical shafts 17$^a$ and 19$^a$.

Now the operation of the machine is as follows: The piles 9, 10, 11, 12, etc., being between the supporting piles 8, are about to be trimmed and tenoned. Both motors 37 and 41 are actuated, causing the saws to rotate and the cab to advance; the motion of the cab may be in either direction without altering the operation of the saws; preferably, however, the motion is that of left to right, Fig. 1, so that the levelling or horizontal saws first encounter the pile, and finally the vertical saws. It is apparent that the upper horizontal saws will cut off the top of the pile, this operation being known as levelling, while the lower horizontal saws will cut the shoulders of the tenon; thereupon the vertical saws engage the pile, and remove the sides from the pile above the shoulders of the tenon, thus then leaving a clean-cut levelled and tenoned pile.

If it is desired only to level the piles, without tenoning, the rear or vertical saws and the lower horizontal saws may be omitted.

It is apparent that I have invented a machine which eliminates all the troublesome handwork involved in cutting and tenoning piles for pier and bridge construction. Especially is the latter awkward because, in building a pier or bridge, the tide often rises over the top of the piles, or above the level of the tenon, in which case further work has to be suspended until the tide has receded. My machine has been found to cut just as well under water as above, so that the work of cutting the piles may be carried on continuously without interruption. This latter advantage, together with the obvious high rate at which my machine can cut piles, makes it possible to cut the piles for a bridge or pier in a small fraction of the time required by the hand method, and my machine also insures absolutely level pile tops and tenons.

After the cab has traveled the width of the beam 1, the latter is then advanced along the rails 32 by actuation of the motor 5, to the next row of piles, and the cab is started back with the saws operating. Thus the fast rate at which my machine enables the piles to be cut and tenoned is readily obvious.

Having thus described my invention, what I claim and desire to secure by Letters Patent is as follows:

1. A machine for levelling and tenoning piles, columns, and the like, comprising a travelling cab, a frame suspended from said cab, vertical shafts having bearings in said frame, a horizontal shaft having vertical saws spaced apart thereon and being bevel-geared to one of said vertical shafts, two of said vertical shafts being provided with two horizontal saws each, the upper saws of both shafts lying mutually adjacent and in the same plane and so arranged that some of the teeth of one at all times project a distance between the spaces between the teeth of the other, the lower of said horizontal saws being spaced apart and lying in the same plane.

2. A machine for levelling and tenoning piles, columns, and the like, comprising a travelling cab, a frame suspended therefrom, vertical shafts having bearings in said frame, a horizontal shaft having vertical saws spaced apart at a distance equal to the width of the desired tenon, and being bevel-geared to one of said vertical shafts, two of said vertical shafts being provided with two horizontal saws each, the upper saws of both shafts lying mutually adjacent and in the same plane and so arranged that some of the teeth of one at all times project a distance between the spaces between the teeth of the other, the lower of said horizontal saws lying below said upper saws at a distance equal to the height of the desired tenon, and being spaced apart and lying in the same plane.

Signed at New York, in the county of New York and State of New York, this 20th day of February A. D. 1920.

JOSEPH W. WUNSCH.